United States Patent [19]

Bussi

[11] Patent Number: 5,129,297

[45] Date of Patent: Jul. 14, 1992

[54] METHOD AND APPARATUS FOR LOCATING UTILITY STRUCTURES BEHIND CONSTRUCTION PANELS

[76] Inventor: Aldo A. Bussi, 372 Taylor Ave., Plainedge, N.Y. 11756

[21] Appl. No.: 537,338

[22] Filed: Jun. 13, 1990

[51] Int. Cl.⁵ .............................................. G01B 5/14
[52] U.S. Cl. .................................... 83/30; 83/660; 30/366; 33/DIG. 10
[58] Field of Search ................. 83/30, 660; 30/360, 30/366; 33/DIG. 10

[56] References Cited

U.S. PATENT DOCUMENTS

| | | |
|---|---|---|
| 241,413 | 9/1876 | Drake . |
| 321,389 | 6/1885 | Schirmer . |
| 346,148 | 7/1886 | Durham . |
| 736,121 | 8/1903 | Lipscomb . |
| 2,775,812 | 1/1957 | Mohr . |
| 2,788,151 | 4/1957 | Shore . |
| 2,898,688 | 8/1959 | Cottar . |
| 3,015,408 | 1/1962 | Campbell et al. ............ 220/3.4 |
| 3,733,707 | 5/1973 | Nix ............................ 33/180 R |
| 3,884,280 | 5/1975 | Chailer .......................... 144/73 |
| 4,059,905 | 11/1977 | Wieting ..................... 33/180 R |
| 4,087,913 | 5/1978 | Jackson ......................... 30/360 |
| 4,096,964 | 6/1978 | Glick .......................... 220/3.4 |
| 4,202,388 | 5/1990 | Wieting ........................ 144/323 |
| 4,209,103 | 6/1980 | Glovier ....................... 220/3.4 |
| 4,335,511 | 6/1982 | Bowling ........................ 30/366 |
| 4,339,973 | 7/1982 | Lawrence ....................... 83/30 |
| 4,359,302 | 11/1982 | Payne .......................... 409/84 |
| 4,605,139 | 8/1986 | Dacar .......................... 220/3.4 |
| 4,779,393 | 10/1988 | Jong ............................ 52/585 |
| 4,802,284 | 2/1989 | Jackson ........................ 33/528 |

FOREIGN PATENT DOCUMENTS 2710397 9/1978 Fed. Rep. of Germany .

Primary Examiner—Mark Rosenbaum
Assistant Examiner—John M. Husar
Attorney, Agent, or Firm—Hopgood, Calimafde, Kalil, Blaustein & Judlowe

[57] ABSTRACT

The present invention concerns the method and apparatus for locating utility structures behind construction panels. In the preferred embodiment, the apparatus is realized in the form of a locator element comprising a body portion, an attachment portion, a puncture portion, and an engaging portion. The body portion has a longitudinal extent with first and second end portions. The attachment portion is provided to the first end portion for attaching to the utility structure, whereas the puncture portion provides to the second end portion for puncturing through the construction panel. The engaging portion on the other hand, is provided for engaging with a tool for removably detaching the locator element from the utility structure. According to the method of the present invention, location of the utility structure is determined using the exposed portion of the locator element which protrudes beyond the construction panel when the construction panel is positioned over the utility structure and in the predetermined mounting position. Thereafter, prior to formation of the access-opening, the locator element is removably detached from the utility structure using the tool.

22 Claims, 3 Drawing Sheets

METHOD AND APPARATUS FOR LOCATING UTILITY STRUCTURES BEHIND CONSTRUCTION PANELS

BACKGROUND OF THE INVENTION

1. Field of Invention

The present invention relates to a method and apparatus for locating the exact position of apertures to be formed in construction panels so that utility structures, such as electrical outlet boxes, cable service boxes, plumbing fixtures, and window frames disposed behind the construction panels, can be accessed through the apertures when the construction panels are installed.

2. Brief Description of Prior Art

A variety of devices are known for locating the exact position of electrical utility boxes disposed behind a construction panel. In this regard, the purpose of determining the location of the utility box is to identify where, relative to the utility box, an access-opening is to be formed in the construction panel. In this manner, when the construction panel is positioned and installed over the utility box, access thereto is provided through access-opening in the construction panel. In the case of an electrical utility box, the precisely-defined access opening permits installation of an electrical switch or outlet after the construction panel has been installed. In the case of a multiple service outlet, the access opening permits installation of computer and TV cables, telephone jacks and the like in a functionally similar manner.

In connection with such a general method, a variety of prior art devices for locating utility box apertures can be found, for example, in U.S. Pat. Nos. 2,775,812 to Mohr; 4,802,284 to Jackson; 2,788,151 to Shore; 2,898,688 to Cottar; 3,015,408 to Campbell, et al.; 3,260,400 to Miles; 4,059,905 to Wieting; 3,733,707 to Nix; 4,096,964 to Glick; 4,202,388 to Wieting; 4,209,103 to Glovier; 4,335,511 to Bowling; 4,209,103 to Glovier; 4,339,973 to Lawrence; 4,359,302 to Payne; and 4,605,139 to Dacar. While each of these prior art devices permits location of apertures to be formed in construction panels, all of these prior art locator devices suffer from several significant shortcomings and drawbacks.

In particular, prior art locator devices require that the located aperture first be removed from the construction panel prior to removing the locator device from the outlet box. Consequently, with the locator device attached to the utility box, it is significantly more difficult to cut the outlined aperture in the construction panel. This increased difficulty translates into more time and effort to the overall operation, causing a reduction in worker productivity.

Also, with prior art locator devices remaining in place through the construction panel during the aperture formation operation, there is increased risk of the cutting tool, such as a jigsaw, striking the locator device. This increased risk can cause several problems: (i) inadvertently cutting of an undesired portion of the construction panel and/or (ii) injuring the cutting tool operator.

In addition to the above shortcomings and drawbacks, prior art locating devices also are incapable of locating apertures in construction panels, for accessing studded window or door frames.

Thus, there is a clear need in the construction art for a method and apparatus for locating utility boxes and studded window and door frames, without the accompanying shortcomings and drawbacks of the prior art methods and apparatus.

Accordingly, it is a primary object of the present invention to provide a method and apparatus for locating the exact position of utility structures behind construction panels, in a way which overcomes the shortcomings and drawbacks of prior art methods and apparatus.

It is a further object to the present invention to provide such a method and a locator device which can be easily removed from behind the construction panel, prior to cutting out the access aperture in the construction panel for the utility structure.

It is a further object of the present invention to provide such apparatus in the form of a pin-like locator element which can be screwed into either the threaded holes of a standard electrical outlet box, wood wall studs or sheet metal using a conventional nut-driver tool, open-end wrench or pliers and which can also be easily be removed from the utility structure using the same tool, prior to removing the cut out access aperture.

A further object of the present invention is to provide such apparatus in the form of a pin-like locator element which can be attached to and removably detached from the utility structure using a conventional nut-driving tool, open-end wrench or pliers.

These and other objects of the present invention will become apparent and hereinafter described in the detailed description and the claims.

SUMMARY OF THE INVENTION

According to one aspect of the present invention, a method is provided for locating a utility structure disposed behind a construction panel to be mounted thereover. In general, the method involves providing at least one locator element having attachment means at one end thereof for attaching to a utility structure, and puncture means at the other end thereof for puncturing through the construction panel. The locator element further includes the engaging means for engagement with a tool for removably detaching the locator element from the utility structure.

In accordance with the method, at least one locator element is attached to the utility structure to be located, and then the construction panel is positioned over the utility structure and disposed in a predetermined mounting position. Sufficient force is then applied to the construction panel so that the puncture means punctures or pierces through the construction panel and protrudes therebeyond to expose at least a portion of the engaging means for engagement with the tool. The location of the utility structure is then determined using the protruding portion of the locator element, and for example, a template matched to the outer front dimensions of the utility structure. Thereafter, with the construction panel positioned over the utility structure while disposed in the predetermined mounting position, the locator element is removably detached from the utility structure by engaging the tool with the exposed portion of the engaging means.

In the preferred embodiment of the present invention, determination of the location of the utility structure is achieved by outlining on the construction board, the general boundaries of the utility structure relative to the locator element. Thereafter, this outlined portion of construction board is removed to provide an access opening to the utility structure.

In the preferred embodiment, the body portion has a polygonally cross-sectioned dimension disposed between the ends of the locator element, and engaging means comprising a portion of the polygonally cross-sectioned body portion which protrudes beyond the construction panel. Also, the detachment means comprises screw threads for screwing into the utility structure. In this embodiment, the tool is preferably a conventional nut driving tool having a socket portion which can be placed over the protruding polygonally cross-sectioned body portion of the locator element. The length of the body portion should be such that when the puncture means protrudes through the construction panel, the socket portion of the nut driving tool can be engaged therewith and used to remove the locator element from the utility structure prior to cutting out the access opening in the construction panel.

Yet in a further embodiment of the present invention, the locator element can be used to simultaneously locate the position of a utility structure disposed behind both an underlying construction panel and an overlying finishing panel.

As a result of the present invention, it is now possible to efficiently locate the position of utility structures behind construction panels using the novel locator element of the present invention, and also to simply remove the locator element from the utility structure prior to cutting the located access opening in the construction panel. Consequently, the present invention provides a significant contribution to the construction art in particular, and to the locating art in general.

BRIEF DESCRIPTION OF THE DRAWINGS

For a further understanding of the objects of the present invention, reference is made to the following detailed description of the preferred embodiments which are to be taken in connection with the accompanying drawings, wherein.

DETAILED DESCRIPTION OF THE PREFERRED EMBODIMENTS

Referring to FIGS. 1A, 1B, 1C, 2, 3, 4A and 4B, in particular, the apparatus of the present invention will now be described.

Figure 1B:
FIG. 1B is a top plan view of the first embodiment of the locator element of the present invention.
Figure 1A:
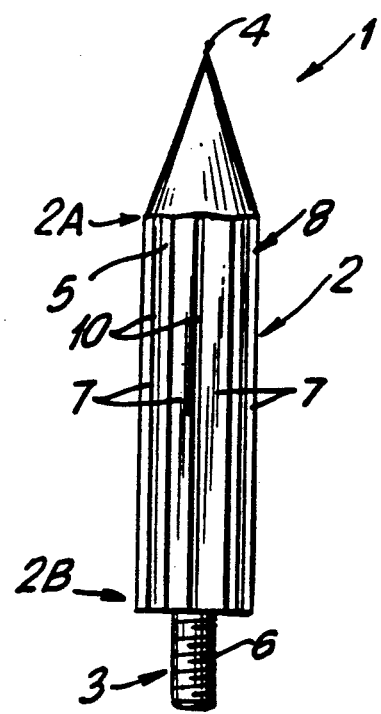
FIG. 1A is an elevated side view of a first embodiment of the locator element of the present invention.
Figure 1C:
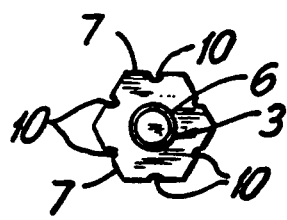
FIG. 1C is a bottom plan view of the first locator element of the present invention.

In FIGS. 1A, 1B and 1C, one embodiment of the apparatus of the present invention is shown in the form of a pin-like locator element 1. In general, the locator element 1 comprises a body or shank portion 2, attachment means 3, puncture means 4, and engaging means 5. The body portion 2 has cylindrical geometry, and thus a longitudinal extent as shown. The body portion 2 also has a first end 2A and a second end 2B, to which the puncture means 4 and the attachment means 3 are provided, respectively.

As shown in FIGS. 1A, 1B and 1C, the attachment means 3 on the second end 2B is realized as a screw structure having machine threads 6 which matches the thread size of the thread holes in a standard U.L. approved electrical outlet box. The puncture means 4 on the first end 2A is realized preferably as a sharp, piercing structure of generally conical geometry. The body portion 2, as shown, comprises a hexagonally cross-sectioned shank of constant cross-sectional dimensions along its length which extends from the screw structure 3 towards the conical puncture means 4. Notably, the cross-sectional dimension of the shank may be realized as any other polygonal form, such as a square or any octagon.

In the illustrated embodiment, each face 7 of the shank 2 has a longitudinally extending groove 10 which facilitates cutting and penetration of the shank through the construction panel. While these grooves are not essential to the present invention, they are believed to facilitate penetration of the shank 2 through the construction panel. The engaging means 5, on the other hand, is realized as a portion 8 of the hexagonally cross-sectioned shank 2. Notably, the length of this shank portion 8 is such that it protrudes beyond a construction panel (such as sheet rock) when the panel is positioned over a utility structure and the puncture means 4 protrudes through the construction panel. As illustrated in FIG. 4C, the hexagonally-dimensioned inner bearing surface of the socket head 18 of a conventional nut driver 19 can be inserted over the conical puncture means 4 and releasibly engaged with the engaging means 5 (i.e., portion 8 of the shank), for screwing the locator element 1 into and out of the threaded holes 11 of the utility structure 12.

Figure 2:
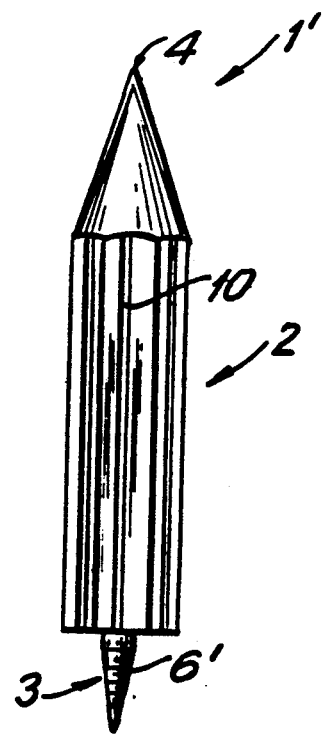
FIG. 2 is an elevated side view of a second embodiment of the locator element of the present invention.
Figure 3:
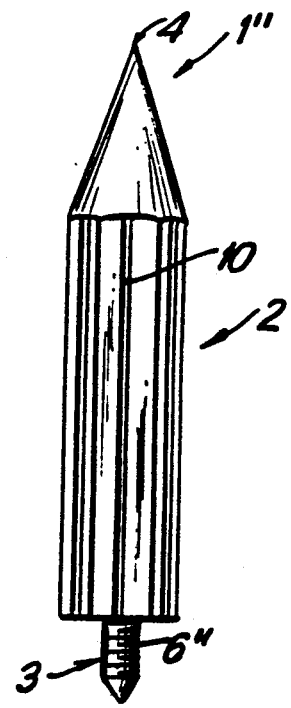
FIG. 3 is an elevated side view of a third embodiment of the locator element of the present invention.

In FIGS. 2 and 3, two other embodiments of the locator element of the present inventions are shown, referenced by 1' and 1", respectively. In FIG. 2, the attachment means 3 of locator element 1' is realized as a screw structure provided with screw threads 6' for self-tapping into wood utility structures; whereas the attachment means 3 shown in FIG. 3 is realized as a screw structure provided with screw threads 6" for self-tapping into metallic utility structures. The size of these various screw threads will differ from application to application, as discussed hereinabove.

Referring to FIGS. 4A, 4B, 4C and 5 the method of the present invention will now be described as follows in connection with the locator element 1 illustrated in FIGS. 1A, 1B, and 1C.

Figure 4A:
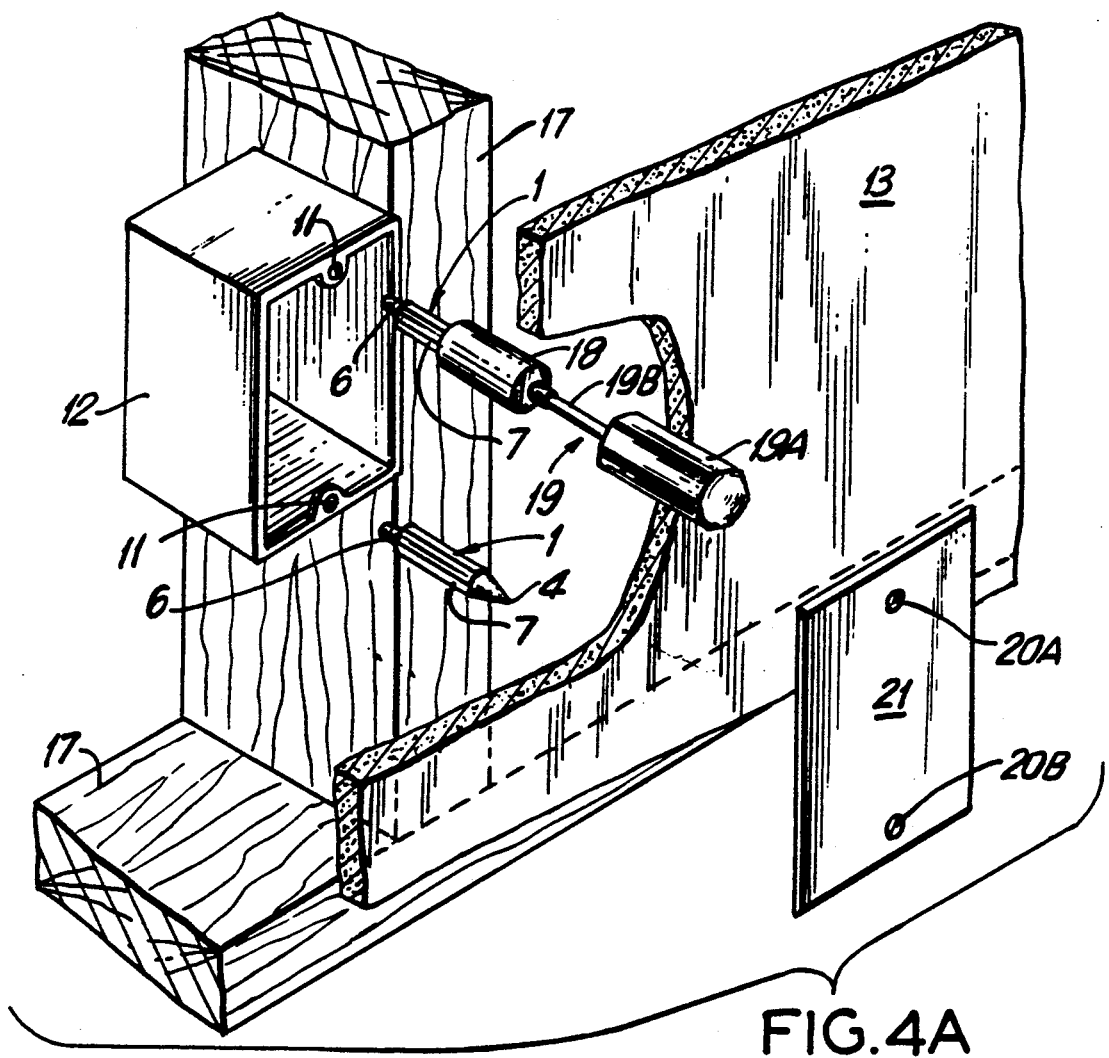
FIG. 4A through 4C are schematic representations illustrating the method of the present invention carried out using the locator element shown in FIGS. 1A, 1B, and 1C.

As shown in FIG. 4A, utility box 12 attached to the stud 17 of a wall structure is exposed in plan view. The conical puncture means 4 of the locator element 1 is placed inside the hexagonally-dimensioned socket head 18 of a conventional nut driver 19 having handle 19A and shaft 19B. In this regard, the shank diameter of each locator element 1 is matched to the internal diameter of the socket head 18. Using the nut driver 19, the machine-screw structure 6 is turned into the threaded hole 11 of utility box 12 until each locator element 1 is securely attached thereto. Then, construction panel 13, typically sheet-rock, is positioned over the utility box 12 in a predetermined mounting position which will be arrived at using conventional construction techniques. Typically at this stage, the construction panel 13 is held into place using several nails or functionally equivalent fasteners.

Figure 4B:
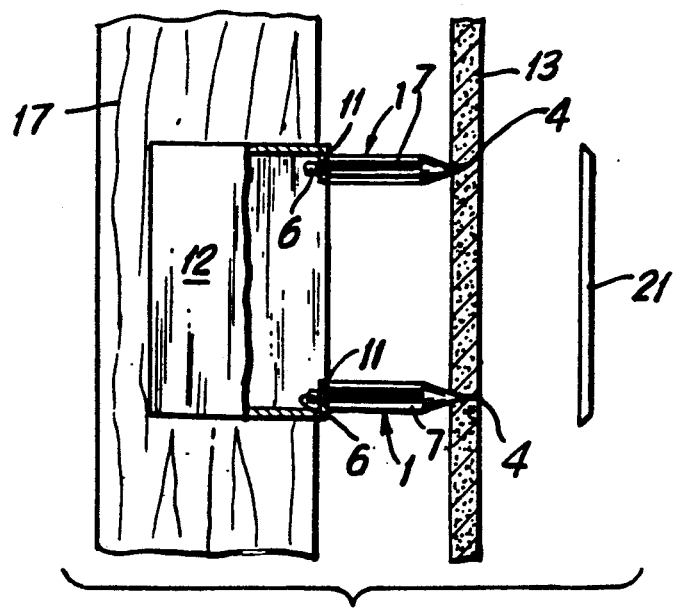
Figure 4C:
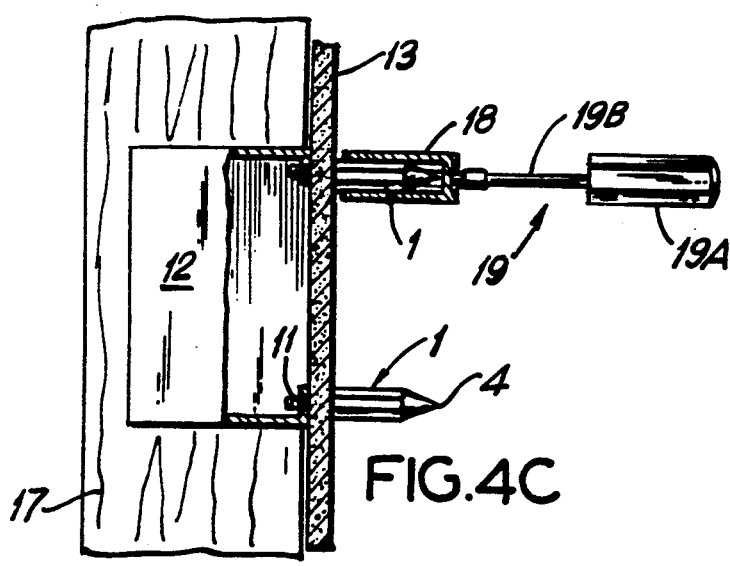

Thereafter, as illustrated in FIG. 4B, sufficient force is applied to the construction panel 13 so that the conically shaped puncture means 4 pierces through the construction panel 13 and protrudes therebeyond to expose at least a portion 8 of the engaging means 5 for engagement with the socket 18 of the nut-driving tool 19. While the construction panel 13 is maintained in place up against and over utility box 12 and wall studs 17 (and others not shown), the exact location of utility box 12 is determined in a conventional manner. Preferably, as illustrated in FIG. 4A, this is performed by placing the holes 20A and 20B of a template 21 over the protruding locator elements so that the template 21 lines up against the construction panel 13 and defines the general outer boundaries of the utility box 12.

After drawing the outline of the template 21 on the construction panel, the template 21 is removed off of the locator elements 1. Then, as illustrated in FIG. 4C, the locator elements 1 are removably detached from the utility box 12 by placing the open end of the socket head 18 over both the puncture portion 4 and the exposed portion 8 of the hexagonally cross-sectioned shank 2 which protrudes beyond the construction panel 13. Then by turning the handle 19A of nut-driver 19, the screw structure 6 of the locator elements 1 turn out of the threaded holes 11 in the utility box 12, after which the locator elements can be easily pulled out of the construction panel altogether. After completion of the above step, the outlined portion of the construction board can be cut out using a drywall razor, drywall hand saw, jigsaw or other conventional cutting tool, and then removed from the construction panel to thereby form an "access opening" therethrough. By applying a gentle force about the formed access opening, utility outlet box 12 is permitted to the extend slightly therethrough until the face edges of the outlet box 12 are either close to or nearly flush with the front surface of the construction panel. Afterwards, the construction panel 13 can now be completely nailed or screwed in place in a conventional manner.

Figure 5:
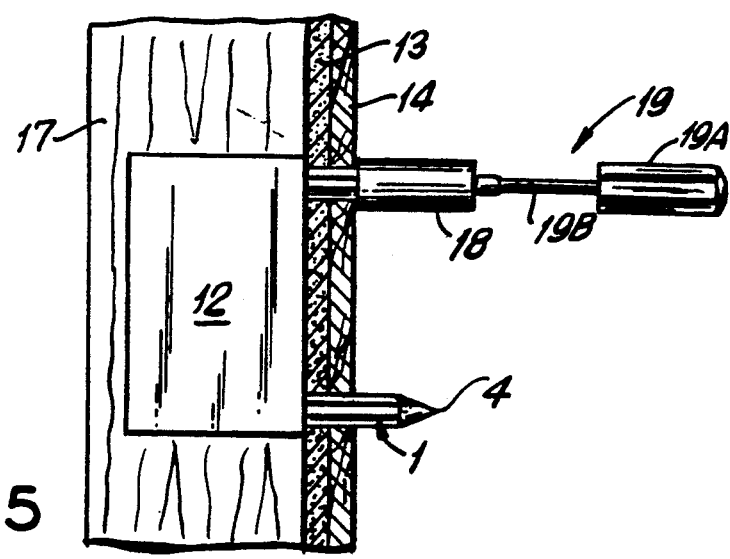
FIG. 5 is a schematic illustration illustrating another embodiment of the method of the present invention.

In FIG. 5, another embodiment of the method of the present invention, is illustrated. In this embodiment, an underlying construction panel (i.e. sheet-rock) 13 is positioned over the utility box 12, so that the locator elements 1 are punctured through the panel in a manner similar to that shown in FIG. 4C. Then an outer finishing panel 14, such as wood paneling for example, is positioned over the underlying construction panel 13 (and thus the utility box 12) so that the puncture means 4 pierces through both the underlying construction panel 13 and finishing panel 14, exposing a lesser portion 8' of the hexagonally cross-sectioned shank 2 so that the socket 18 can engage therewith, as hereinbefore described. In this position, the outer finishing panel 14 is secured in place using several fastening devices, such as nails or screws. Then after outlining the boundaries of the utility box 12 on finishing panel 14, using for example template 21, the locator elements 1 are removed from the utility box, as described hereinabove. Afterwards, the outlined portion of both the outer and underlining construction and finishing panels 14 and 13 are preferably cut out simultaneously using a single cutting tool. In this method, perfectly congruent access openings are formed in both of the construction and finishing panels 13 and 14 in a time and labor efficient manner.

While the method and apparatus of the present invention has been described above in connection with locating the position of utility boxes behind construction panels, the present invention can be used to locate other types of utility structures.

Figure 6:
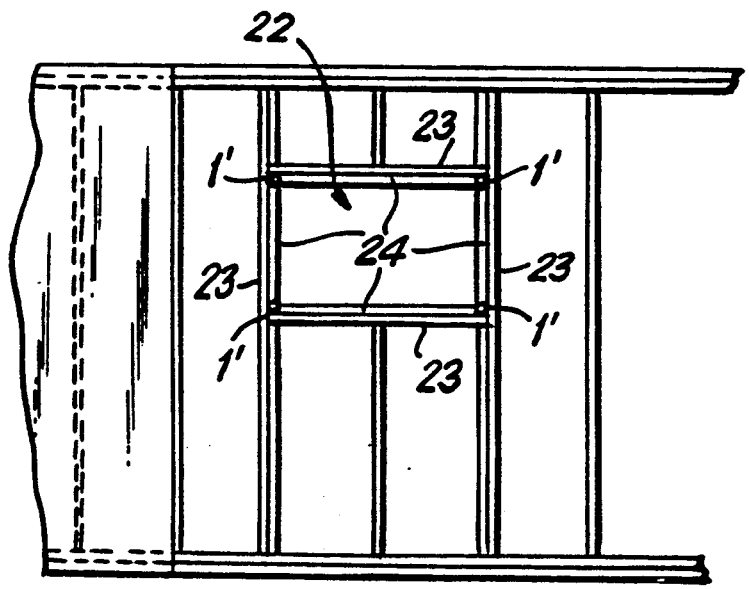
FIG. 6 is a schematic illustration of a wall constructed from an assembly of studs arranged to form a conventional window frame, for which an access opening in a construction panel is located using the method and locator element of the present invention.

For example, as illustrated in FIG. 6, the locator elements 1' shown in FIG. 3 can be screwed into the face portion 24 of a preconstructed window (or door) opening 22 formed by a studded frame 23. Notably, such a window opening 22 would be provided for the installation of a window unit or door (not shown) in a manner well known in the art. Preferably, a plurality of such "self-tapping" locator elements 1' are screwed into the face portion 24 of the window opening 22. Typically, the position of these self-tapping locator elements 1, will be along a locus of points disposed away from the inner perimeter of the frame 23, preferably at a constant preselected distance, e.g. $\frac{3}{4}\Delta$, therefrom. After installing a number of these locator elements 1' sufficient to define an "access-opening" which corresponds to the opening 22 formed by the studded frame 23, a construction panel is positioned over the frame 23, causing the puncture means 4 of the elements 1' to pierce through the panel upon application of sufficient pressure, as hereinbefore described. Then, the general locus of protruding locator elements are used to draw the outline or boundary of the window opening 22 upon the construction panel. Afterwards, the locator elements are removed, and then the access opening is cut out along the outline drawn upon the construction panel.

While the particular embodiments shown and described above have proven to be useful in many applications in the construction art, further modifications of the present invention herein disclosed will occur to persons skilled in the art to which the present invention pertains, and all such modifications are deemed to be within the scope and spirit of the present invention defined by the appended claims.

What is claimed is:

1. A method of locating a utility structure disposed behind a construction panel to be mounted thereover, said method comprising the steps:
    (a) providing at least one locator element having screw threads at one end thereof for screwing into said utility structure, and puncture means at the other end thereof for puncturing through said construction panel, and further having engaging means for engagement with a tool for unscrewing said locator element out of said utility structure;
    (b) screwing at least one said locator element into said utility structure to be located;
    (c) positioning said construction panel over said utility structure and disposed in a predetermined mounting position;
    (d) applying sufficient force to said construction panel so that said puncture means pierces through said construction panel and protrudes therebeyond to expose at least a portion of said engaging means for engagement with said tool;
    (e) determining said location of said utility structure using said protruding portion of said locator element; and (f) with said construction panel positioned over said utility structure while disposed in said predetermined mounting position, unscrewing said locator element out of said utility structure by engaging said tool with said exposed portion of said engaging means and rotating said locator element relative to said utility structure.

2. The method of claim 1 wherein said step (e) comprises outlining on said construction board, the general boundaries of said utility structure relative to said locator element.

3. The method of claim 2, which further comprises after step (f)

removing said outlined portion of said construction board determined in step (e).

4. The method of claim 2, wherein step (e), further comprises using a template to outline said general boundaries of said utility structure.

5. A method for locating a utility structure disposed behind a construction panel to be mounted thereover, said method comprising the steps:

(a) providing at least one locator element having attachment means at one end thereof for attaching to said utility structure, and puncture means at the other end thereof for puncturing through said construction panel, and further having engaging means for engagement with a tool for removably detaching said locator element from said utility structure;

(b) attaching at least one said locator element to said utility structure to be located;

(c) positioning said construction panel over said utility structure and disposed in a predetermined mounting position;

(d) applying sufficient force to said construction panel so that said puncture means pierces through said construction panel and protrudes therebeyond to expose at least a portion of said engaging means for engagement with said tool;

(e) determining said location of said utility structure using said protruding portion of said locator element; and (f) with said construction panel positioned over said utility structure while disposed in said predetermined mounting position, removably detaching said locator element from said utility structure by engaging said tool with said exposed portion of said engaging means, wherein said body portion has a polygonally cross-sectioned dimension disposed between said ends of said locator element, and said engaging 6. The method of claim 5, wherein step (b) comprises placing the socket portion of a nut driving tool over said puncture means so as to engage said polygonally cross-sectioned body portion of said locator element, and turning said locator element so that said screw threads screw into said utility structure, and wherein prior to step (c), said method further comprises disengaging said nut driving tool from said locator element.

7. The method of claim 6, wherein step (f) comprises removing said locator element by (i) placing the socket portion of said nut-driving tool over said protruding polygonally cross-sectioned body portion of said locator element, (ii) turning said locator element so that said screw threads unscrew out of said utility structure, and (iii) pulling said locator out from said construction panel.

8. A locator element for locating utility structures disposed behind a construction panel, said locator element comprising:

a body portion of longitudinal extend having a first end portion and a second end portion;

screw threads provided to said first end portion for screwing into said utility structure;

puncture means provided to said second end portion for puncturing through said construction panel; and engaging means for engaging with a tool for unscrewing said locator element out of said utility structure while said utility structure is disposed behind said construction panel and with said puncture means punctured through said construction panel.

9. The locator element of claim 8, wherein said engaging means is provided to one or both of said body portion and said puncture means so that when said construction panel is positioned over said utility structure and said puncture means pierces through said construction panel, said engaging means is engagable with said tool for removably detaching said locator element from said utility structure.

10. A locator element for locating utility structures disposed behind a construction panel, said locator element comprising:

a body portion of longitudinal extend having a first end portion and a second end portion;

attachment means provided to said first end portion for attaching to said utility structure;

puncture means provided to said second end portion for puncturing through said construction panel; and engaging means for engaging with a tool for removably detaching said locator element from said utility structure, wherein said engaging means is provided to one or both of said body portion and said puncture means so that when said construction panel is positioned over said utility structure and said puncture means pierces through said construction panel, said engaging means is engagable with said tool for removably detaching said locator element from said utility structure, wherein said attachment means comprises screw threads for screwing into said utility structure, wherein said body portion comprises a polygonally cross-sectioned shank of a length which extends towards said puncture means, and wherein said engaging means comprises at least a portion of said polygonally cross-sectioned shank, the length of said portion protruding beyond said construction panel when said construction panel is positioned over said utility structure and said puncture means protrudes through said construction panel.

11. The locator element of claim 10, wherein said screw threads comprise threads characteristic of a machine screw.

12. The locator element of claim 10, wherein said screw threads comprise threads characteristic of a self-tapping wood screw.

13. The locator element of claim 10, wherein said screw threads comprise threads characteristics of a self-tapping metal screws.

14. The locator element of claim 10, wherein said utility structure comprises a utility box adapted for mounting to the studs of a wall and having at least one internal set of threads for receiving said screw threads of said locator element, said screw threads of said locator element being adapted to be received within said internal set of threads formed within said utility box.

15. A locator element for locating utility structures disposed behind a construction panel, said locator element comprising:

a body portion of longitudinal extend having a first end portion and a second end portion;

attachment means provided to said first end portion for attaching to said utility structure;

puncture means provided to said second end portion for puncturing through said construction panel; and engaging means for engaging with a tool for removably detaching said locator element from said utility structure, wherein said engaging means is provided to one or both of said body portion and said puncture means so that when said construction panel is positioned over said utility structure and said puncture means pierces through said construction panel, said engaging means is engagable with said tool for removably detaching said locator element from said utility structure, wherein said attachment means comprises screw threads for screwing into said utility structure, and wherein said engaging means comprises a diametrically disposed slot formed in said puncture means permitting insertion of the end of a screwdriver.

16. The locator element of claim 15, wherein said screw threads comprise threads characteristic of a machine screw.

17. The locator element of claim 15, wherein said screw threads comprise threads characteristic of a self-tapping wood screw.

18. The locator element of claim 15, whereby said screw threads comprise threads characteristics of a self-tapping metal screw.

19. A method of locating a utility structure disposed behind one or more construction panels to be mounted thereover, said method comprising the steps:

(a) providing at least one locator element having screw threads at one end thereof for screwing into said utility structure, and puncture means at the other end thereof for puncturing through said construction panels, and further having engaging means for engagement with a tool for unscrewing said locator element out of said utility structure;

(b) screwing at least one said locator element into said utility structure to be located;

(c) positioning a first construction panel over said utility structure and disposed in a predetermined mounting position;

(d) applying sufficient force to said first construction panel so that said puncture means punctures through said first construction panel and protrudes therebeyond to expose at least a portion of said engaging means for engagement with said tool;

(e) positioning a second construction panel over said first construction panel and in said predetermined mounting position;

(f) applying sufficient force to said second construction panel so that said puncture means punctures through said second construction panel and protrudes therebeyond to expose at least a portion of said engaging means for engagement with said tool;

(g) determining said location of said utility structure using said protruding portion of said locator element; and (h) with said first and second construction panels disposed over said utility structure while disposed in said mounting position, unscrewing said locator element out of said utility structure by engaging said exposed portion of said engaging means with said tool and rotating said locator element relative to said utility structure.

20. The method of claim 19, wherein said step (g) comprises outlining on said second construction board, the general boundaries of said utility structure relative to said locator element.

21. The method of claim 20, which further comprises after step (h)

removing a portion of said first and second construction panels defined by said general boundaries.

22. The method of claim 21, wherein step (e) further comprises using a template to outline said general boundaries.

* * * * *